United States Patent
Kao

[11] Patent Number: 6,075,985
[45] Date of Patent: *Jun. 13, 2000

[54] WIRELESS ACCESS SYSTEM WITH DID AND AIOD FUNCTIONS

[75] Inventor: Joel Kao, Nepean, Canada

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/786,939

[22] Filed: Jan. 23, 1997

[51] Int. Cl.$^7$ .................................................. H04B 7/26
[52] U.S. Cl. ........................ 455/422; 455/445; 455/555
[58] Field of Search ................................... 455/415, 458, 455/463, 403, 422, 445, 450, 554, 555

[56] References Cited

U.S. PATENT DOCUMENTS

| | | |
|---|---|---|
| 3,573,386 | 4/1971 | Thompson . |
| 4,191,849 | 3/1980 | Vrba . |
| 5,070,521 | 12/1991 | Warner et al. ............................ 455/415 |
| 5,274,699 | 12/1993 | Ranz ....................................... 455/415 |
| 5,371,781 | 12/1994 | Ardon ...................................... 379/59 |
| 5,524,045 | 6/1996 | Yazawa . |
| 5,537,610 | 7/1996 | Mauger . |
| 5,544,227 | 8/1996 | Blust et al. ............................. 455/445 |
| 5,633,873 | 5/1997 | Kay et al. ............................... 455/450 |
| 5,636,266 | 6/1997 | Ranganath et al. ..................... 455/415 |
| 5,781,856 | 7/1998 | Jacobs et al. ........................... 455/425 |
| 5,787,355 | 7/1998 | Bannister et al. ...................... 455/458 |

FOREIGN PATENT DOCUMENTS

| | | | |
|---|---|---|---|
| WO 96/01543 | 1/1996 | WIPO | ............................. H04Q 7/20 |
| WO 96/13948 | 5/1996 | WIPO | ............................. H04Q 7/20 |
| WO 96/32824 | 10/1996 | WIPO . | |
| WO 96/39001 | 12/1996 | WIPO | ............................. H04Q 7/38 |
| WO 97/44981 | 11/1997 | WIPO | ............................. H04Q 7/38 |
| W O97/50262 | 12/1997 | WIPO | ............................. H04Q 7/20 |

*Primary Examiner*—Reinhard J. Eisenzopf
*Assistant Examiner*—Lester G. Kincaid
*Attorney, Agent, or Firm*—Aprilia U. Diaconescu

[57] ABSTRACT

A fixed wireless access system includes a base station for bidirectional communication with a switching center, a private branch exchange (PBX) for bidirectional communication with a plurality of user stations, and a wireless trunk interface (WTI). The WTI communicates with the base station over a bidirectional wireless air link, and with the PBX over a bidirectional trunk line. Since a wireless link is established between a dual radio unit (DRU) at the base station and a transceiver at the WTI, the slots normally allocated to the directory number of the called and calling parties in the current air interface, must be used to identify the transceiver involved in the exchange of information. Therefore, the DN of the called station behind the PBX is transmitted to the WTI using other fields of the air interface, and presented to PBX in a format acceptable for establishing a correct connection (DID service). Similarly, the DN of the calling station behind the PBX, is transmitted to base station and presented to switching center using a format acceptable for use by the switching center (AIOD service).

10 Claims, 4 Drawing Sheets

FIG. 3A

| INFORMATION ELEMENT | LENGTH (BITS) |
|---|---|
| T1T2=01 | 2 |
| RL_W | 5 |
| SIGNAL | 8 |
| CPN_RL | 6 |
| PI | 2 |
| SI | 2 |
| RSVD=000 | 3 |
| P | 12 |

FIG. 3B

| INFORMATION ELEMENT | LENGTH (BITS) |
|---|---|
| T1T2=01 | 2 |
| RSVD=00 | 2 |
| CHARACTER | 8 |
| CHARACTER | 8 |
| CHARACTER | 8 |
| P | 12 |

FIG. 5

| INFORMATION ELEMENT | LENGTH (BITS) |
|---|---|
| F=0 | 1 |
| NAWC | 3 |
| 1ST DIGIT | 4 |
| 2ND DIGIT | 4 |
| 3RD DIGIT | 4 |
| 4TH DIGIT | 4 |
| 5TH DIGIT | 4 |
| 6TH DIGIT | 4 |
| 7TH DIGIT | 4 |
| 8TH DIGIT | 4 |
| P | 12 |

WIRELESS ACCESS SYSTEM WITH DID AND AIOD FUNCTIONS

BACKGROUND OF THE INVENTION

1. Field of the Invention

This invention relates to fixed wireless access communication networks, and in particular to a method of passing directory numbers of a called party between a central office and a PBX over a wireless link.

2. Background Art

Wireless access technology was initially developed to provide phone services to remote communities. As technology improved and cost came down, this basic service has advanced from voice only transmissions in the rural areas, to voice, data, fax and other telecommunication service in the rural, sub-urban and urban areas. With the demand for wireless communication on a continuous rise, subscribers expect to receive the same full range of services that are beginning to emerge in the wireline environment, such as data, video telephony, video-on-demand, and also they increasingly expect voice and data quality that is equal to, or better than in wireline telephone systems.

The main difference between wireless access, cellular, and PCS systems is that the wireless access technology is not designed for mobility, and as such, systems do not allow for roaming and provide only limited cell site hand-off. Nevertheless, the existing cellular systems standards were adopted for the wireless access, since the protocols for establishing the connection and communication between a customer and the service provider are similar.

An emerging system architecture named fixed wireless (radio) access, also known as wireless local loop, or fixed radio, provides telephone, facsimile and data services to individual business and residential subscribers. A fixed wireless system comprises two main elements: a base station (or base), located at a cell site, and telephone stations located at the customer's premise, each equipped with a radio unit. If more than one telephone station is provided, all have the same destination address. The subscriber premise may also be equipped with a residential junction unit (RJU), which provides one or more independent telephone jacks for each subscriber. The base station is connected to standard switches in the public network through copper cables, optical fiber, or microwave links. A base station includes microwave radio units, which supply a two-way radio link between the stations at the subscriber premise and the base station.

A more recent architecture for fixed wireless radio access systems was designed for providing wireless communications between a cell site and a private branch exchange (PBX) installed at the customer premise, a plurality of on-premise subscriber stations being connected to the PBX over cabled connections. A PBX, which is a switching center, typically has a trunk connection to a central office, which is also a switching center. To transmit information between the PBX and the switching center over a wireless link, it is necessary for the wireless link to appear to the PBX as a central office trunk with direct inward/outward dial capabilities.

Such an architecture is disclosed in U.S. Pat. No. 5,787, 355 (Bannister et al., filed on Apr. 22, 1994 and assigned to Northern Telecom Limited). For direct inward dial (DID) calls, the wireless system passes on an air interface to a radio unit (RU), and from there to the PBX, information on the called party, so that an incoming call can be presented to the proper phone in the PBX, by making the interface between the RU and the PBX look like a central office trunk, as per LSSGR FR-NWT-000064 BellCORE specification.

The system disclosed in Bannister's application can be configured with a plurality of RUs, each RU responding to a plurality of mobile identification numbers (MINs). A master radio unit controls a bank of slave RUs to route a call. To this end, a RU has a transceiver section which establishes a communication link between the PBX and the base station under the supervision of a programmable control unit, and a re-programmable memory for storing information such as MIN lists or MIN to station directory numbers (DN), or PBX address correlation information.

According to the present invention, for an incoming call originating in the public switched telephone network (PSTN) and directed to a user station in the PBX, the DN of the called party is passed on from the central office switch to a cell station, from the cell station to a wireless trunk interface (WTI) over a wireless link, and from there to the PBX, so that the connection is established with the proper station behind the PBX.

For calls originating from a user station behind the PBX to a called party in the PSTN, the DN of the calling party is passed on from the PBX to the WTI, and from there, over a wireless link to the cell station and to the central office switch, so that the calling party DN is presented to the switch. The DN of the calling party may be used, for example, for billing purposes.

In other words, the invention is directed to a wireless radio access system provided with a direct inward dial (DID) and an automatic identification outward dialling (AIOD) function, for passing the directory number (DN) between the service provider and the customer. The DID and AIOD functions are implemented using the fast/slow associated control channel of the air interface.

SUMMARY OF THE INVENTION

It is an object of this invention to provide a wireless radio access system for reliable, inexpensive wireless communication between a PBX installed at customer premise and a central office of a telephone service provider.

It is another object of this invention to provide a radio to trunk interface for connecting a base station of a cellular wireless network to a PBX, which is adapted to pass the directory number (DN) of a station served by the PBX in both forward and reverse directions using the IS-54B air interface protocol.

Still another object of this invention is provide a wireless radio access system adapted to deliver DID and AIOD service to callers connected to a PBX.

According to this invention, there is provided a fixed wireless access system for connecting a first station served by a PSTN to a second station served by a PBX, and directly passing the second station directory number ($DN_2$) to/from said first station. The fixed wireless access system includes a base station for exchanging a first bidirectional signal with the first station based on the first station directory number ($DN_1$), the first bidirectional signal comprising the $DN_2$. The system is also provide with a wireless trunk interface (WTI) for exchanging a bidirectional wireless signal with the base station over an air interface (AIF), based on a WTI identification, the bidirectional wireless signal comprising the $DN_2$.

According to another aspect of this invention, there is provided a method for establishing communication between a first user station in a public switched telephone network and a second user station served by a PBX comprising: (a) establishing a bidirectional communication link between a base station and the first user station; (b) establishing a bidirectional communication link between the PBX and the second user station; (c) establishing a bidirectional wireless communication link between a wireless trunk interface (WTI) and the base station using an air interface protocol; (d) establishing a trunk link between the WTI and the PBX; and (e) directly passing the second stationary number ($DN_2$) to/from the first station over the bidirectional wireless communication link.

Advantageously, the invention provides an economical alternative to wireless user stations while maintaining wireless transmission between the cell site and the customer premise. By providing a wireless trunk interface at the customer premise, and wireline connections on the premise, some steps of the current air interface protocols are not necessary, such as the hand-off function or establishing a best available air link between the cell site and the mobile.

The system according to this invention provides low start-up costs and investment tailored subscriber growth. In addition, it provides a wide range of services over a wireless link, such as standard telephone service, pay phones, data and fax, on a common hardware platform.

BRIEF DESCRIPTION OF THE DRAWINGS

The foregoing and other objects, features and advantages of the invention will be apparent from the following more particular description of the preferred embodiments, as illustrated in the appended drawings, where:

FIG. 3A shows the first word of the Alert_With_Info order on the forward analog voice channel;

FIG. 3B shows the second word of the Alert_With_Info order on the forward analog voice channel;

FIG. 5 shows the format of the first word of the "Called address" of the "Origination message".

DESCRIPTION OF THE PREFERRED EMBODIMENT

The Advanced Mobile Phone System (AMPS) is implemented in over 40 countries with the main subscriber in the United States. This standard defines pairs of analog communication channels for establishing a radio link in both forward (base to station) and reverse (station to base) directions. A forward and a reverse control channels (FOCC and RECC) are assigned for exchange of digital control information, and a forward and reverse analog voice channel (FVC and RVC) are assigned for user communication.

Figure 1:
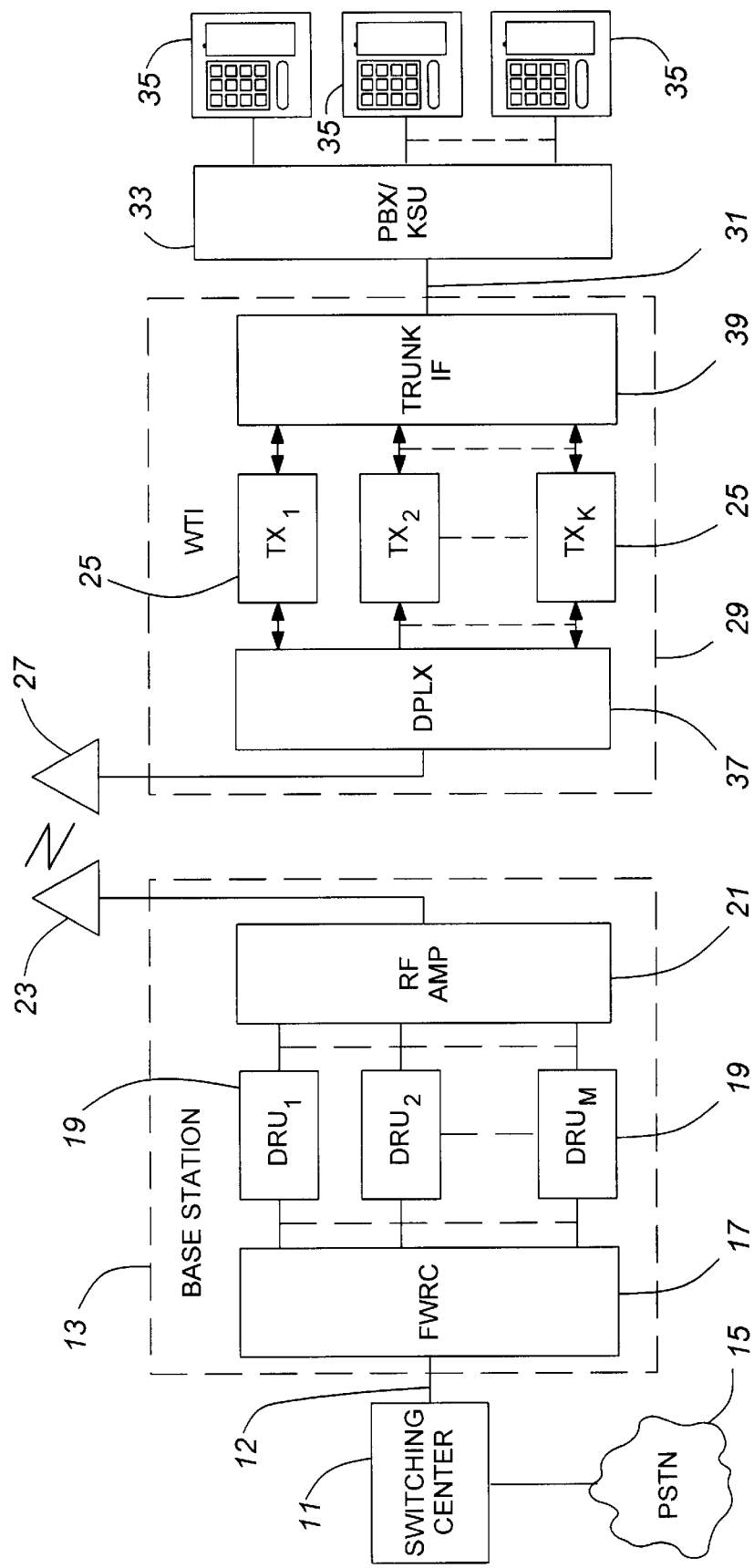
FIG. 1 is the block diagram of a fixed wireless access system according to the invention.

FIG. 1 is a block diagram showing a fixed wireless system according to the invention. A switching centre, generally designated by 11, acts as an interface between the radio equipment located at the base station 13 and the public switched telephone network (PSTN) 15. The switching center could be for example a DMS-100i, or a class 5 local exchange, or a DMS MTX (a mobile switching center). The switching center 11 performs the switching for a plurality of cell sites and the call processing to manage the calls.

Base station 13 comprises a fixed wireless radio controller (FWRC) 17 which controls a plurality of dual mode radio units (DRUs) 19. The radio system used at the base station 13 for the fixed wireless access system of the invention may be one originally designed for mobile cellular telephony. The term "dual mode" is used in this disclosure to specify that the respective unit is adapted for both analog and digital mode of operation. Each DRU is equipped with a transmitter and a receiver for processing analog and digital information. Special bit patterns in the bit fields "Order" and "Order Qualifier" of the FOCC and RECC indicate digital mode calls.

There are two types of DRUs used at the base station, depending on the type of channel they serve. A DRU for a control channel is used to set-up calls. A backup is ready in case of prime failure. There are several DRUs for voice and traffic channels at each cell site.

An RF amplifier 21 and an antenna 23 are also present at the cell site for providing the conversion of the electrical/radio signals to radio/electrical signals. A wireless link between antenna 23 and antenna 27 connects the base station 13 with a wireless trunk interface (WTI) 29. WTI 29 is installed at the customer premise, which may be for example, an office building, a shopping mall, or the like. WTI 29 effects the re-conversion of the radio/electrical signal into an electrical/radio signal and communicates through trunk lines 31 with a PBX 33. Depending on the application, the PBX 33 may be replaced with a key system unit (KSU).

A plurality of user stations (ST) 35 are connected to the PBX/KSU 33 in the known way, to obtain a multi-line application with an acceptable grade of service. FIG. 1 illustrates telephone stations, but it is to be understood that the stations may also be fax machines, data/video terminals, or any type of terminals supported by a telecommunication network.

WTI 29 is equipped with a plurality of transceivers (TX) 25 which are connected to antenna 27 through a duplex circuit 37. For example, 4–16 radio transceivers can provide 16 to 120 lines of telephone services. Circuit 37 is of a known type, designed to establish a bidirectional communication between a TX and antenna 27. Antenna 27 may be an indoor (dipole) or outdoor (Yagi) antenna. Furthermore, a single antenna may be used for a group of TXs 25, or one antenna for each TX 25, depending on the application.

A TX 25 comprises a transmitter and a receiver for bidirectional transmission. Trunk interface 39 connects TXs 25 with PBX/KSU 33 through conventional telephone trunk lines 31.

An incoming call is defined herein a call originated by a station in PSTN 15 for routing to a station 35 behind PBX 33. An outgoing call is defined herein a call originated by a station 35 behind PBX 33 for routing to a station in the PSTN.

Since a wireless link is established between a DRU at the base station 13 and a transceiver 25 of WTI 29, the slots normally allocated to the DN in the current air interface, must be used to identify the transceiver $TX_k$ involved in the exchange of information. Therefore, the DN of the called station behind PBX 33 must be transmitted to WTI 29 using other fields of the air interface, and presented to PBX 33 in a format acceptable for establishing a correct connection (DID service). Similarly, the DN of the calling station ST 35 behind PBX 33, must be transmitted to base station 13 and presented to switch 11 using a format acceptable for use by the switching center 11 (AIOD service).

For an incoming call, the message words received over a forward control channel (FOCC) are extracted from the respective slot and used for establishing connection between a DRU at the base station and a TX at the WTI. Once on a voice/traffic channel, the DN of the called station ST behind PBX 33 is extracted from the message words of the air interface, mapped into a digital signal block, such as for example a DS-30 block, and communicated to PBX/KSU unit 33 which uses the DN in the conventional way for routing the call to the called station.

For an outgoing call, the WTI extracts the DN of the calling station from, for example, a DS30 block maps this information into message words and communicates the message words to base station 13 over a reverse channel.

According to the present invention, the DID and the AIOD services are implemented using prefix digits added to the calling ID for the incoming calls, and added to the dialled string for the outgoing calls.

For example, if a station in PSTN 15 with a directory number $DN_1$ calls a station 35 with a directory number $DN_2$ (7 digits)-9876, a string "#9876" is prefixed to $DN_1$ in the Alert_With_Info order, such that the calling ID becomes #9876+$DN_1$. For sending the calling party DN from a station 35 to the switch, the string #9876 is prefixed to the dialled number, such that the dialled number becomes #9876+$DN_1$.

Figure 2:
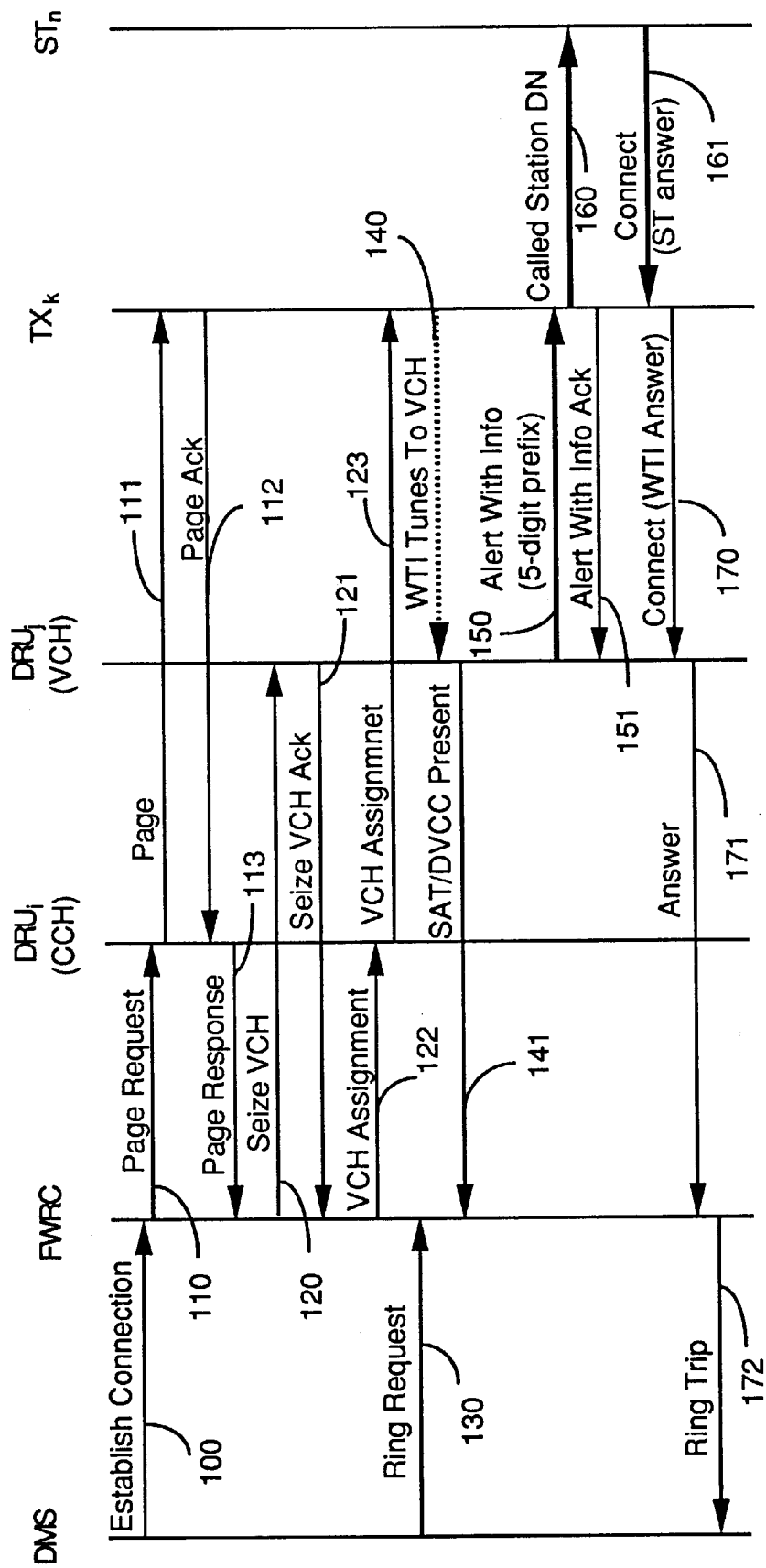
FIG. 2 is a chart illustrating the prefix mode of operation of the system of FIG. 1, for an incoming call.

FIG. 2 shows the mode of operation of the system of FIG. 1 when DID is implemented using prefix digits added to the calling ID. According to the invention, the 5-digit prefix described above is added to the "Calling Party Number" message sent by the base station over the FOCC.

A forward voice channel (FVC) is a wideband data stream sent by the base station to the mobile station. This data stream is generated at a 10 kbit/second rate. A dotting sequence and a word synchronization sequence are sent on the FVC to permit mobile stations to achieve synchronization with the incoming data, followed by a message word. Each word contains 40 bits, including parity, and is repeated 11 times together with the dotting and synchronization sequences; it is then referred as a word block.

A first task includes the protocols for setting-up a connection between the calling station in PSTN 15 and WTI 29, until a forward and reverse voice channels are allocated by the system to the call. During this task, a free $TX_k$ 25 in the WTI 29 uses its unique mobile identification number (MIN) to establish a radio link with a DRU at base station 13, in a known way. Thus, in step 100, a connection between the switching center 11 and FWRC 17 is established along a wireline link identified on FIG. 1 with reference numeral 12. In step 110, FWRC 17 looks for a free forward control channel (FOCC) and a free control channel DRU. In step 111, $DRU_i$ is allocated to the FOCC, and the $DRU_i$ broadcasts a page signal to WTI 29 on this FOCC. A wireless link is established between $DRU_i$ and $TX_k$ 25, if the user station 35 with the directory number of interest is recognised by the WTI. When a response to the page is received by $DRU_i$ and FWRC, respectively, as determined in steps 112 and 113, controller 17 seizes a forward and a reverse voice/traffic channels, as shown in steps 120 and 121. A free voice/traffic $DRU_j$ is also allocated to the selected VCHs and FWRC communicates the VCH assignment to $TX_k$ over the FOCC in steps 122 and 123.

The pair of voice channels, comprising a FVC and a corresponding reverse voice channel (RVC), is used by the transmitters and the receivers of the base station and WTI for bidirectional wireless communication.

The second task comprises the protocols for establishing the connection between the calling the called parties. During the second task, the switching center 11 transmits a ring request to the FWRC in step 130. In step 140, transceiver $TX_k$ tunes on the forward and reverse voice channels.

The response to a digital message sent by a base station is either a digital signal, or a status change in the SAT/DVCC signal sent by the mobile station on the RVC. A supervisory audio tone (SAT) is a signal used to confirm that the mobile is tuned on the voice channel, while digital verification color code (DVCC) indicates that the mobile is tuned on a digital traffic channel.

For the system of the invention, when WTI tunes on the VCH, transceiver $TX_k$ allocated to the call in progress modulates the VCH carrier frequency with a SAT received form the base station on the VCH. $DRU_j$ transmits to the FWRC the SAT/DVCC signal in step 141.

Next, $DRU_j$ exchanges with $TX_k$ the "Alert_With_Info" and "Alert_With_Info_Ack" messages during steps 150 and 151.

The called mobile station, normally identified in the air interface messages, is in the case of this invention one of the fixed transceivers of the WTI. therefore, for communicating to the PBX the called station DN, the system uses the information element Calling_Party_Number of the Alert_With_Info order. The format of the first and second words of this order are illustrated in FIGS. 3A and 3B.

In FIG. 3A, element T1T2 is the type element which indicates if the order comprises more than one message word. Element RL_W indicates the remaining length in words of the Alert_With_Info order, field SIGNAL is an 8-bit information element that causes the mobile to generate tones and alerting signals to the user.

CPN_RL is a 6-bit element indicating the number of characters of the calling party ID. For this invention, this element should indicate the additional five prefix characters.

PI is the presentation indicator controlling whether or not the calling party number should be displayed, while SI is the screening indicator informing how the calling number was screened. RSVD is a element reserved for future use and, finally, P is the parity element.

FIG. 3B shows the format of the remaining Alert_With_Info words. Each element CHARACTER is an 8-bit representation of and ASCII character. In the absence of a sufficient number of characters in the last word of the order, null characters are used as filler.

The information element Calling_Party_Number of this order has a bit length up to 146 bits. As indicated above, the number sign "#", followed by the last four digits of the called party DN are added to the calling ID in the Alert_With_Info order. This 5-digit prefix occupies the space of 20 bits (5 digits×4 digits/bit). The remaining 126 bits of the element Calling_Party_Number is sufficient for accommodating the calling party DN.

Turning to FIG. 2, the $TX_k$ acknowledges the Alert_With_Info order by a change in the SAT as shown in step 151. Next, the called station DN is mapped into a trunk block and connection to station $ST_n$ is established through PBX 33, in the known manner, as shown in steps 160 and 161. The WTI connects the called station to the FWRC, shown in steps 170 and 171, and the FWRC generates a ring trip in step 172, finalizing the connection between the calling party in the PSTN 15 and station $ST_n$.

Figure 4:
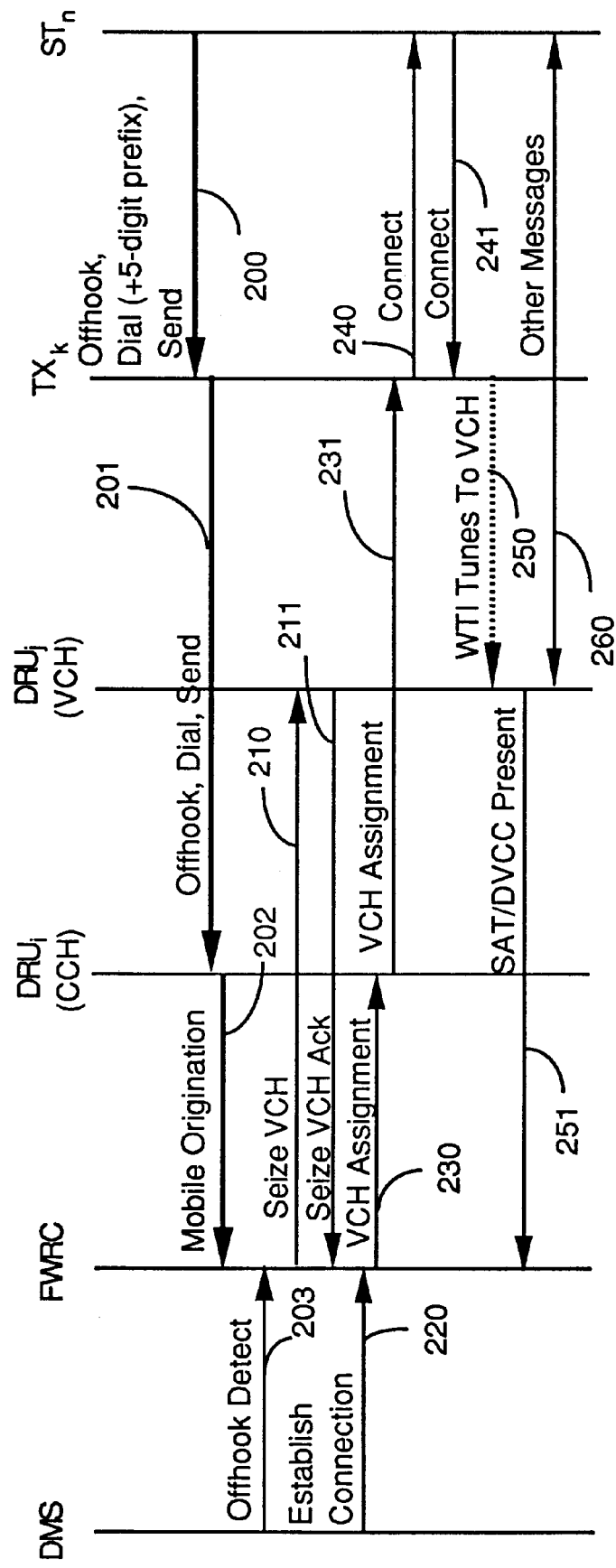
FIG. 4 is the chart for showing the prefix mode of operation for the system of FIG. 1, for an outgoing call.

FIG. 4 illustrates the steps for connecting a call originating at station $ST_n$ 35 to a station in PSTN 15, when AIOD is implemented using prefix digits added to the dialled string. According to the invention, the 5-digit prefix described above is added to the dialled string of the "Origination message" by the WTI to the base station over the reverse control channel (RECC).

The reverse analog control channel (RECC) is a wideband data stream sent from the mobile to the base station. This data stream must be generated at a 10 kbpi rate. All messages on this channel begin with the RECC seizure precursor that is composed of a 30-bit dotting sequence, a 11-bit synchronisation sequence and the coded digital color code (DCC). Each word contains 48 bits including parity and is repeated five times; it is then referred as a word block. A RECC message generally comprises one to six words. The messages that are transmitted on this channel are: "Page response message", "Origination message", "Order confirmation message", and "Order message", which are made up of combination of message words. The words used on RECC are the Abbreviated address (word A), Extended address (word B), Serial number (word C), Authentication (word C), Unique challenge order confirmation (word C), Base station challenge (word C), and First and Second word of the called address (words D and E).

FIG. 5 shows the format of the Word D, the first word of the called address of the "Origination message", the format of the second, third and fourth words being similar. In this Figure, F is the indication element, which is 1 in the first word of the message, NAWC is the number of additional words coming, and n-th DIGIT is a dialled digit.

Section 4.1 of the IS-54B specification indicates that the mobile station may be equipped with the optional capability for permitting to send up to 32 dialled digits to a base station on RECC in an "Origination message". In this case, two more word of the called address (words F and G) must be sent in addition to words D and E, if the access is an origination, and as such, NAWC, which is generally set to 0 in word E, should be set to 2. By using 5 digits for the prefix, the remaining 27 digits of the "Origination Message" should be sufficient for any international dialling.

The protocols for setting-up a connection between a user station $ST_n$ and switching center 11, is unchanged, with the difference that the dialled string comprises the 5-digit prefix. The connection between $ST_n$ and the WTI 29 is established through PBX 33 over trunk lines 31. Trunk interface 39 receives the off-hook, dialled string and SEND signals from PBX/KSU 33, and forwards same to a selected $TX_k$, as shown in step 200. In step 201, $TX_k$ uses its unique MIN to establish connection with a free control channel $DRU_i$ over a free RECC, and transmits the dialled string to $DRU_i$. $DRU_i$ communicates the dialled string to the FWRC in step 202, where the calling party number is extracted from the dialled string for use by the switching center 11 in the known manner. When switching center 11 detects the off-hook signal issued by $ST_n$, it transmits a supervision report to FWRC 17 in step 203. FWRC 17 seizes a forward and reverse voice/traffic channel and a free voice/traffic $DRU_j$, in steps 210 and 211, which is followed by the switching center 11 making the connection between FWRC 17 and the called station behind the switch in step 220. Furthermore, FWRC 17 informs $DRU_i$ and $TX_k$ of the voice/traffic channel assignment in steps 230 and 231 on the FOCC. Then, the connection between the $TX_k$ and the $ST_n$ is made as shown in steps 240 and 241.

During the second task, transceiver $TX_k$ tunes to the voice/traffic channel, step 250 and broadcasts the SAT/DVCC to FWRC, step 251, indicating that the voice/traffic channels are ready for transmission.

During the conversation task, information may be exchanged between the called station in the PSTN 15 and the calling station $ST_n$.

While the invention has been described with reference to particular example embodiments, further modifications and improvements which will occur to those skilled in the art, may be made within the purview of the appended claims, without departing from the scope of the invention in its broader aspect.

I claim:

1. A method for establishing communication between a first user station in a public switched telephone network (PSTN), said first user station having a first station directory number ($DN_1$), and a second user station served by a private branch exchange (PBX), said second user station having a second station directory number ($DN_2$), comprising the steps of:
    (a) establishing a bidirectional communication link between a base station and said first user station;
    (b) establishing a bidirectional communication link between said PBX and said second user station;
    (c) establishing a bidirectional wireless communication link between a wireless trunk interface (WTI) and said base station using an air interface (AIF) protocol, based on an identification of said WTI;
    (d) establishing a trunk link between said WTI and said PBX; and
    (e) passing said $DN_2$ over said wireless communication link within said AIF protocol; and
    wherein said step of passing said $DN_2$ over said wireless communication link comprises:
        generating at said base station a forward message comprising said $DN_1$ and a character string indicative of said $DN_2$; and
        prefixing said character string to said $DN_1$ in a plurality of message words of the "Calling ID" message of the alert with info control signal.

2. A method as claimed in claim 1, wherein said step of establishing a bidirectional wireless communication link comprises:
    setting-up a connection between a control channel dual radio unit (DRU) at said base station and a transceiver at said WTI, using a mobile identification number (MIN) of said transceiver;
    selecting a voice channel DRU and establishing connection between said voice channel DRU and said transceiver over a forward voice channel (FVC) and a reverse voice channel (RVC); and
    confirming that said voice channel DRU and said transceiver are ready to communicate.

3. A method as claimed in claim 2, wherein said step of confirming comprises exchanging the "alert_with_info" and "alert_with_info_ack" control signals between said voice channel DRU and said transceiver.

4. A method as claimed in claim 1, wherein said step of establishing a trunk link comprises extracting said $DN_2$ from said character string at said WTI and providing said $DN_2$ to said PBX over said trunk link.

5. A method for establishing communication between a first user station in a public switched telephone network (PSTN) and a second user station served by a private branch exchange (PBX), comprising the steps of:
    (a) establishing a bidirectional communication link between a base station and said first user station;
    (b) establishing a bidirectional communication link between said PBX and said second user station;
    (c) establishing a bidirectional wireless communication link between a wireless trunk interface (WTI) and said base station using an air interface protocol;

(d) establishing a trunk link between said WTI and said PBX; and (e) passing a signal including the second station directory number ($DN_2$) to/from said first station over said bidirectional wireless communication link;

wherein, for an incoming call identified by a calling party directory number $DN_1$ to said second user station identified by said directory number $DN_2$, said step of establishing a bidirectional wireless communication link comprises setting-up a wireless connection between a control dual radio unit (DRU) at said base station and a transceiver at said WTI, using a unique identification of said WTI comprised in a called party message of said incoming call;

tuning said transceiver of a forward voice channel (FVC) to communicate with a voice/traffic DRU at said base station;

generating, at said base station, a forward message comprising said $DN_1$ and a character string indicative of said $DN_2$ and broadcasting said forward message to said transceiver over said FVC; and tuning said transceiver on a reverse voice channel (RVC) and establishing a wireless connection between said transceiver and said voice/traffic DRU over said RVC;

and wherein said air interface protocol is a cellular system dual mode mobile station-base station compatibility standard IS-54B, and said character string is prefixed to said $DN_1$ in a plurality of message words of the "Calling ID" message of the "Alert_With_Info" order standard S-54B.

6. A method for establishing communication between a first user station in a public switched telephone network (PSTN) and a second user station served by a private branch exchange (PBX), comprising the steps of:

(a) establishing a bidirectional communication link between a base station and said first user station;

(b) establishing a bidirectional communication link between said PBX and said second user station;

(c) establishing a bidirectional wireless communication link between a wireless trunk interface (WTI) and said base station using an air interface protocol;

(d) establishing a trunk link between said WTI and said PBX; and (e) passing a signal including the second station directory number ($DN_2$) to/from said first station over said bidirectional wireless communication link;

wherein, for an incoming call identified by a calling party directory number $DN_1$ to said second user station identified by said directory number $DN_2$, said step of establishing a bidirectional wireless communication link comprises setting-up a wireless connection between a control dual radio unit (DRU) at said base station and a transceiver at said WTI, using a unique identification of said WTI comprised in a called party message of said incoming call;

tuning said transceiver of a forward voice channel (FVC) to communicate with a voice/traffic DRU at said base station;

generating, at said base station, a forward message comprising said $DN_1$ and a character string indicative of said $DN_2$ and broadcasting said forward message to said transceiver over said FVC; and tuning said transceiver on a reverse voice channel (RVC) and establishing a wireless connection between said transceiver and said voice/traffic DRU over said RVC;

and wherein said step of generating a forward message comprises:

forming said character string to start with a special character followed by the last four digits of said DN2;

mapping said prefix string in a plurality of message words of the "Calling ID" message with the "Alert_With_Info" order of the standard IS-54B; and modifying the indicator RL_W of the first message word of the Alert_With_Info order to show the length of said forward message.

7. A method for establishing communication between a second user station served by a private branch exchange (PBX), said second user station having a second station directory number ($DN_2$), and a first user station in a public switched telephone network (PSTN), said first user station having a first station directory number ($DN_1$), comprising:

(a) establishing a bidirectional communication link between said second user station and said PBX;

(b) establishing a trunk link between said PBX and a wireless trunk interface (WTI);

(c) establishing a bidirectional wireless communication link between said WTI and a base station using an air interface (AIF) protocol, based on an identification of said WTI;

(d) establishing a bidirectional communication link between said base station and said first user station; and (e) passing said $DN_1$ over said wireless communication link within said AIF protocol; and wherein said step of passing said $DN_1$ over said wireless communication link comprises:

generating at said WTI a reverse message comprising said $DN_1$ and a character string indicative of said $DN_2$; and prefixing said character string to said $DN_1$ in the "called address" message of the "origination message" control signal of said AIF protocol.

8. A method as claimed in claim 7, wherein said step of establishing a bidirectional wireless communication link comprises:

receiving a communication request from said WTI to said first user station and setting-up a connection between a transceiver at said WTI and a control channel dual radio unit (DRU) at said base station using a mobile identification number (MIN) of said WTI;

selecting a voice channel DRU and establishing connection between said transceiver and said voice channel DRU over a reverse voice channel (RVC) and a forward voice channel (FVC); and confirming that said transceiver and said voice channel DRU are ready to communicate over said bidirectional wireless communication link.

9. A method as claimed in claim 8, wherein said step of confirming comprises exchanging the "alert_with_info" and "alert with_info_ack" control signals between said voice channel DRU and said transceiver.

10. A method as claimed in claim 7, wherein said step of establishing a bidirectional communication link between said base station and said first user station comprises extracting said $DN_1$ from said character string at said base station and providing said $DN_1$ to said PSTN.

* * * * *